United States Patent
Takahashi et al.

[11] Patent Number: 6,053,150
[45] Date of Patent: Apr. 25, 2000

[54] FUEL-INJECTION SYSTEM FOR ENGINES

[75] Inventors: Susumu Takahashi; Yasuhiro Nishiyama, both of Kanagawa, Japan

[73] Assignee: Isuzu Motors Limited, Tokyo, Japan

[21] Appl. No.: 09/275,405

[22] Filed: Mar. 24, 1999

[30] Foreign Application Priority Data

Mar. 31, 1998 [JP] Japan ................................. 10-101870

[51] Int. Cl.$^7$ ................................................. F02M 37/04
[52] U.S. Cl. ........................ 123/501; 123/458; 123/300
[58] Field of Search .................................. 123/299, 300, 123/501, 456, 458, 357

[56] References Cited

U.S. PATENT DOCUMENTS

| | | | |
|---|---|---|---|
| 4,788,960 | 12/1988 | Oshizawa | 123/458 |
| 5,462,032 | 10/1995 | Nakamura | 123/501 |
| 5,485,820 | 1/1996 | Iwaszkiewicz | 123/458 |
| 5,678,521 | 10/1997 | Thompson | 123/501 |
| 5,778,852 | 7/1998 | Penteker | 123/501 |
| 5,848,581 | 12/1998 | Hirose | 123/501 |
| 5,954,030 | 9/1999 | Sturman | 123/458 |
| 5,957,111 | 9/1999 | Rodier | 123/458 |
| 5,988,143 | 11/1999 | Dietz | 123/458 |

FOREIGN PATENT DOCUMENTS

| | | |
|---|---|---|
| 5-302537 | 11/1993 | Japan . |
| 6-511527 | 12/1994 | Japan . |

*Primary Examiner*—Carl S. Miller
*Attorney, Agent, or Firm*—Browdy and Neimark

[57] ABSTRACT

A fuel-injection system for an engine is disclosed for accomplishing a minute fuel injection by learning the minimum conductive duration to electronic devices for the beginning of the minute fuel injection. A controller unit may output at a time Tp a command pulse of an actuating current that is applied to solenoid-operated valves to make injectors to carry out the fuel injection. After a definite length of time $T_0$ has elapsed, a common rail pressure begins decreasing from a mean value $P_0$, which is kept until then. The controller unit changes incrementally the conductive duration Pwp of the command pulse for a pilot injection from the minimal conductive duration, and identifies the timing of the beginning of the fuel injection with the timing when an area Ar of pressure reduction is over a preselected value. In case the desired amount of fuel to be injected is too minute, the controller unit may calculate the conductive duration dependently on the minimum command pulse width.

6 Claims, 11 Drawing Sheets

FUEL-INJECTION SYSTEM FOR ENGINES

BACKGROUND OF THE INVENTION

1. Field of the Invention

The present invention relates to a fuel-injection system in which fuel is charged into combustion chambers in accordance with the hydraulic pressure of a hydraulically actuated fluid supplied from an accumulator.

2. Description of the Prior Art

An electronically-controlled fuel-injection system has been well known in which injectors are each provided with a needle valve movable in an injector body in a reciprocating manner to open and close injection holes, and an electronic device applied with an actuating current so as to control the hydraulically actuated fluid for driving the needle valve upwards and downwards, whereby the fuel to be injected out of the injectors is regulated in injection timing and amount to be injected per cycle by a controller unit, depending on the operating conditions of the engine.

There have been conventionally proposed two types of the electronically-controlled fuel-injection system, one of which is a fuel-injection system of hydraulically actuated fuel type in which a high-pressure fuel stored in a common fuel supply rail, for example, is used in place of the hydraulically actuated fluid, and comprised of injectors each having a main body provided therein with a pressure control chamber for the high-pressure fuel, and a solenoid-operated valve for the electronic device to control an ingress and egress of the hydraulically actuated fuel into and out of the high-pressure chamber whereby the needle valve is made to move upwards and downwards in response to the hydraulic force of the high-pressure fuel in the high-pressure chamber so as to inject the pressurized fuel through the injection holes that have been free from the needle valve. Another type of the injector is a fuel-injection system of hydraulically actuated oil type in which a high-pressure engine oil is used as the hydraulically actuated fluid, and comprised of injectors each having a solenoid-operated valve for the electronic device to control an ingress the hydraulically actuated engine oil, and a boosting piston actuated with the admitted engine oil so as to intensify the fuel in an intensified chamber whereby the pressure of the pressurized fuel makes the needle valve move upwards and downwards so as to inject the pressurized fuel through the injection holes that have been free from the needle valve. In either type of the fuel-injection system, the actuation of the electronic device, or the solenoid-actuated valve, is controlled with the actuating current output from an electronically-controlling apparatus, or a controller unit. Upon lifting the needle valve by the action of the hydraulically actuated fluid that is intensified to a high pressure and supplied into the injectors with the operation of the electronic controller unit, the fuel is injected out of the injection holes at a preselected amount and at a preselected injection timing.

Figure 11:
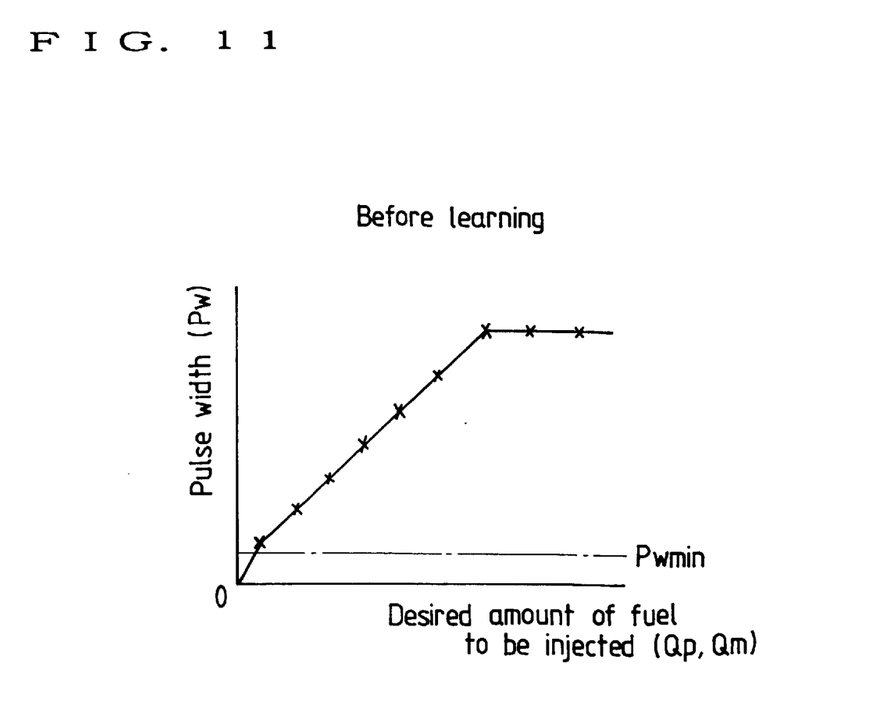
FIG. 11 is a graphical representation illustrating a relation of the desired amount of the injected fuel versus the pulse width in the prior fuel-injection system for the engines.

Most electronically-controlled fuel-injection systems as described just above usually determine the actual amount of the injected fuel with both of the pressure of the hydraulically actuated fluid and the conductive pulse width to the electronic device. The controller unit is stored with data regarding correlation of the desired amount of injected fuel versus the conductive pulse width for every pressure of the hydraulically actuated fluid and refers to the correlation data applicable to the pressure of the hydraulically actuated fluid and the desired volume of the injected fuel at some selected time, resulting in determining the conductive pulse width that corresponds to the length of time during which the electronic device is energized. FIG. 11 is a graphical representation showing a correlation data of desired volume of injected fuel versus pulse width at some selected injection pressure in a prior fuel-injection system for engines. In this correlation, the data given at specified points from previous experiments are stored in the form of a map marked with x in FIG. 11 while the conductive pulse width between the adjoining specified points, or marks x, is given by the process of interpolation. When a minute fuel injection is required in the electronically-controlled fuel-injection systems, the conductive pulse width for actuating the electronic device to this end is given by interpolating the range between the origin and the minimum value out of the data of the specified points in FIG. 11.

A version of fuel-injection system has been known in which the desired amount of fuel to be injected per one cycle is divided into a main injection part and a pilot injection part of minute amount, which is charged in advance of the main injection to thereby reduce the initial heat release rate of the combustion chamber, resulting in accomplishing the reduction in noise and NOx emissions. Disclosed in Japanese Patent Laid-Open No. 302537/1993 is an example of an electronically-controlled fuel-injection system for regulating the fuel injection by means of the solenoid-operated valve operable as described above. The fuel-injection system in the above citation is a common-rail fuel-injection system having a pilot injection executable mode. This prior system, when the pilot injection mode and the starter are simultaneously in the "on" state, may identify whether the common-rail pressure and its rise rate are less than the predetermined levels. If the pressure situations are less, the pilot injection mode is turned off to thereby terminate the pilot injection. Accordingly, there is no automatic execution of the pilot injection instruction under the event of cranking the engine where the common-rail pressure is insufficient, resulting in eliminating the repeated waste leakage of fuel. No fuel injection out of the injectors is carried out with a command pulse width less than the minimum command pulse width Pwmin. That is, the fuel injection inevitably requires the application of a command pulse having a pulse width more or equal to the width Pwmin. It is to be noted that the minimum command pulse width, shown with a broken line Pwmin in FIG. 11, during which the fuel injection may be carried out is actually different at every injector owing to the aging and scattering in characteristics inherent in each injector. In some cases, the fuel injection failure, where the amount of the injected fuel is 0, may happen whether the electronic device, or the solenoid-actuated valve, is conducting with the conductive pulse width calculated corresponding to the desired amount of the fuel injection. The minimum command pulse width at every injector is usually unknown at which the fuel injection will start. Even if the minimum command pulse width Pwmin were given initially, it would undergo a change due to the aging. The events of the fuel injection failure as described above are apt to remarkably occur in the case of the prior pilot injection. In these events, not only no expected advantage of the pilot injection is accomplished, but also a major problem arises of increasing the noise and the amount of NOx emissions. Also in the engine small in displacement per a cylinder, the pilot injection becomes the origin of a scattering or variation in the amount of the injected fuel in the idling during which the desired amount of the injected fuel reduces in the minute fraction, resulting in disturbing the steady idling of the engine, that is, large variation in the rotational frequencies.

In the meantime the pressure in the common fuel supply rail in the electrically-controlled fuel-injection system as described above drops down once the fuel is injected actually out of the injectors. This teaches the pressure change in the common fuel sully rail relates to the fuel injection out of the injectors. In the fuel-injection control, accordingly, the common rail pressure is particular one of the necessary information for determining the fuel-injection duration during which the desired amount of the fuel is injected according to the calculation. To this end, pressure sensors have been already incorporated in the common rail in the prior fuel-injection system in order to pick up the pressure in the common rail. On the technology trend as described above, a concept has happened whether it is possible to make the fuel-injection system to learn the minimum pulse width necessary for beginning the fuel injection at every injector by making use of the data concerning with the common rail pressure detected at the pressure sensor.

SUMMARY OF THE INVENTION

A primary object of the present invention is to overcome the problems in the prior art as having been described above, and in particular to provide a fuel-injection system for seeking out a pulse width at every injector, where the fuel injection is admitted, by incrementally changing the pulse width from the minimal pulse width at which the actual amount of the injected fuel is 0, then storing the sought pulse width as the minimum command pulse width in the associated injector, during which the fuel injection may be actually carried out, and determining a conductive pulse width between the minimum command pulse width and the foregoing minimum value out of the data of the specified points to thereby accomplish a minute amount of the injected fuel.

More particularly, the present invention is concerned with a fuel-injection system for an engine comprising injectors for injecting fuel into combustion chambers of the engine dependently on a hydraulic pressure of a hydraulically actuated fluid supplied from an accumulator, electronic devices each energized by an electronic actuating current to thereby control the hydraulic pressure of the hydraulically actuated fluid, and a controller unit for determining a desired amount of an injected fuel per cycle in accordance with signals issued from detecting means monitoring operating conditions of the engine and further determining a conductive duration of the actuating current to the electronic devices correspondingly with the desired amount of fuel to be injected per cycle, whereby the controller unit changes incrementally the conductive duration from the minimal conductive duration at which no fuel injection is admitted at the injector, identifies the minimum conductive duration with the conductive duration where the injectors begin to inject the fuel, and determines the conductive duration corresponding to a minute desired amount of fuel to be injected, depending on the minimum conductive duration.

In one aspect of the present invention, the detecting means include a pressure sensor for monitoring a pressure of the hydraulically actuated fluid in the accumulator, and the controller unit identifies a timing for the beginning of the fuel injection at the injectors with the timing at which the pressure value of the hydraulically actuated fluid detected by the pressure sensor falls below a preselected value. As an alternative, the detecting means include a lift sensor for monitoring an amount of lift of needle valves in the injectors, and the controller unit identifies a timing for the beginning of the fuel injection at the injectors with the timing at which the lift sensor detects a preselected amount of lift.

In another aspect of the present invention, the controller unit divides the desired amount of the injected fuel into a pilot injection part and a main injection part, and determines the conductive duration corresponding to the pilot injection part, depending on the minimum conductive duration.

In a further another aspect of the present invention, the electronic devices are each composed of a solenoid-operated valve arranged in the associated injector so as to control the supply of the hydraulically actuated fluid into the injector.

In a further aspect of the present invention, the conductive duration corresponding to the desired amount of the injected fuel is given by interpolating between the minimum conductive duration and any specified conductive duration corresponding to any specified desired amount of the injected fuel.

The detection and update of the minimum conductive duration may be carried out, for example, at every just after the starting of the engine, or alternatively may be learned at every a preselected length of the total operating time, for example, at every 100 hours, of the engine. In some cases, the minimum conductive duration may undergo a change owing to the pressure difference in the hydraulically actuated fluid. On these versions, it may be necessary to learn the minimum conductive duration at every pressure of the hydraulically actuated fluid, which has been made to reach during the operation of the engine. The lift sensor for detecting whether the actual fuel injection exists usually requires the use of expensive position sensors such as Hall sensors or the like. In contrast, in such situation that no lift sensor is permitted in respect of cost and durability, the hydraulic pressure sensor equipped inherently in the accumulator of the fuel-injection system may be utilized so as to identify the timing of the actual fuel injection with the timing when the sensor has just detected the pressure drop owing to the fuel injection.

According to the fuel-injection system for engines of the present invention, for example, in order to accomplish the pilot injection, the conductive duration for the beginning of the fuel injection at the injector is sought out by incrementally changing the command value for the pilot injection, that is, the conductive duration of the actuating current applied to the electronic devices to energize the pilot injection, from 0 or the minimal value at which no actual fuel injection is certain. Whether the actual pilot injection has accomplished may be identified, depending on the presence or absence of the common rail drop within a preselected length of time from the beginning of the electric conduction.

Figure 10:
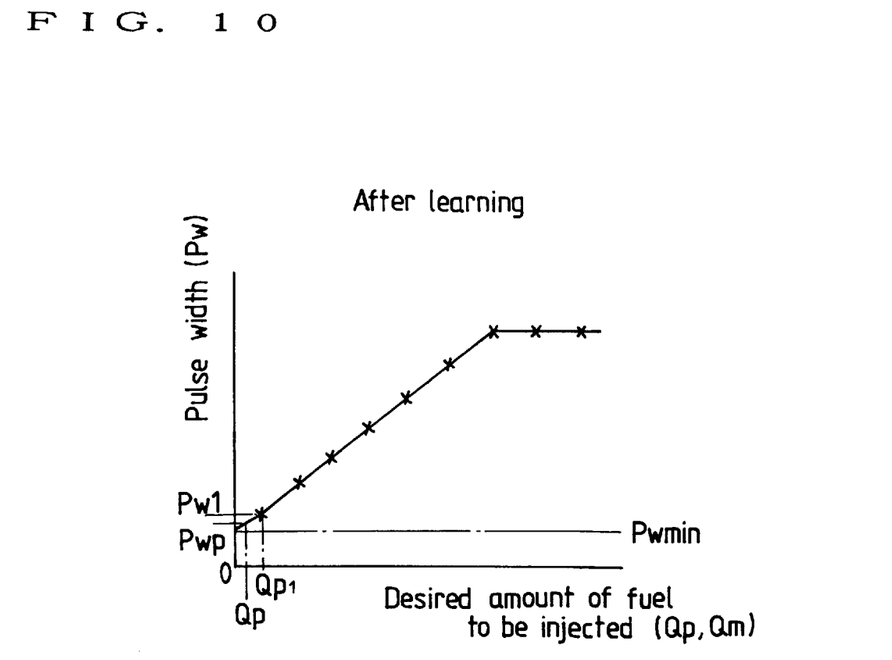
FIG. 10 is a graphical representation illustrating an improved relation of the desired amount of the injected fuel versus the pulse width.

The relation of the desired amount of the injected fuel versus the conductive duration of the actuating current, or the command pulse width, is given by a mapped graphical representation, for example, shown in FIG. 10, which illustrates an improved relation of the desired amount of the injected fuel versus the pulse width in the fuel-injection system for the engine according to the present invention. The command pulse width corresponding to the desired amount of the injected fuel of 0 has the initial value of 0 in accordance with the correlative data, shown in FIG. 11, of the prior fuel-injection system. In contrast, the system of the present invention provides the minimum command pulse width Pwmin of the initial value by the result of learning. This command pulse width Pwmin is learned and stored at every starting the engine. In some cases, the minimum command pulse width may undergo a change owing to the pressure difference in common rail. On these events, the minimum command pulse width is required correspondingly to each common rail pressure in FIG. 10. To this end, the final command pulse width is found by learning the minimum command pulse corresponding to the common rail pressures that exceed the respective common rail pressures during the operation of the engine. The present invention, hence, makes it possible to determine the conductive pulse width for metering the minute amount of the injected fuel at every injector, whereby no fuel-injection failure may be ensured for the engine small in displacement as well as the pilot injection, resulting in the steady idling and the pilot injection effective in suppression of noise and NOx emissions. Moreover the learning in the present invention should be carried out under the steady common rail pressure. To this end, the main injection alone is preferably energized with no pilot injection for a length of time spanning from just after the starting to the steady idling rotation of the engine.

The learning according to the present invention makes it possible to provide the minimum command pulse with accuracy for the beginning of the fuel injection, in spite of the individual injectors differing from each other in their characteristics or the injectors undergoing the change in characteristics owing to aging. In addition, even the engine small in displacement per a cylinder, the scattering in the fuel injection may become less at idling during which the desired amount of the injected fuel decreases to the least amount, resulting in making less the fluctuation in rotational frequency and improving the steadiness in idling.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DESCRIPTION OF THE PREFERRED EMBODIMENTS

A preferred embodiment of a fuel-injection system according to the present invention will be explained in detail hereinafter with reference to the accompanying drawings.

Figure 12:
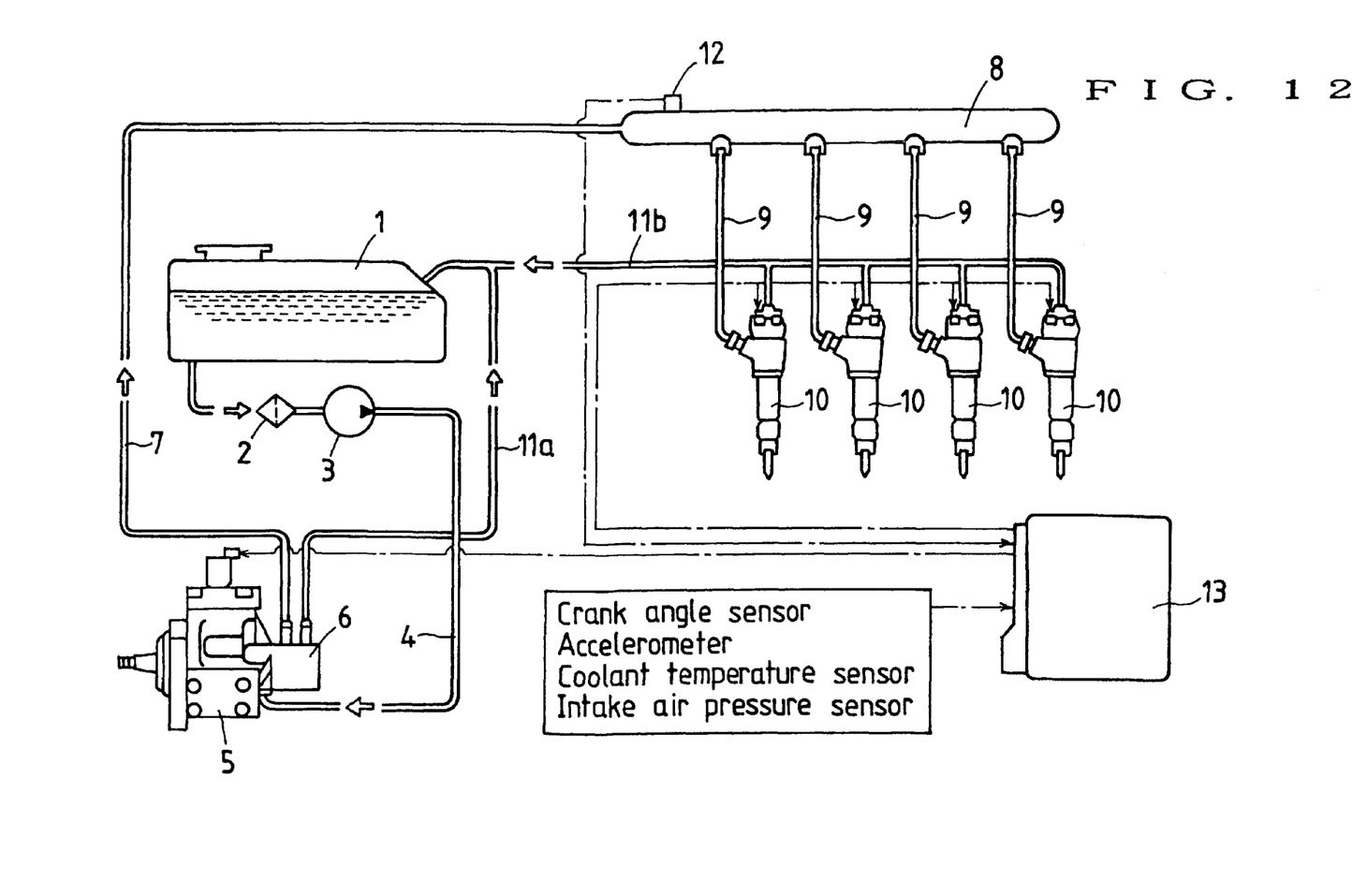
FIG. 12 is a schematic illustration showing a fuel-injection system of hydraulically actuated fuel type in which a high-pressure fuel stored in a common fuel supply rail.

Schematically shown in FIG. 12 is an example of a fuel-injection system of hydraulically actuated fuel type in which a high-pressure fuel serves as the hydraulically actuated fluid. This fuel-injection system is preferably applicable to a fuel-injection system for engines according to the present invention. The fuel sucked up by a fuel pump 3 through a fuel filter 2 from a fuel tank 1 is pressurized to a predetermined suction pressure and fed through a fuel line 4 to a high-pressure fuel pump 5 that is, for example, what is known as a plunger type fuel-supply pump driven by an engine. The high-pressure fuel pump 5 intensifies the fuel to a desired pressure dependent on the operating conditions of the engine and feeds the pressurized fuel to the common fuel supply rail 8 in which the fuel is stored under a design pressure. The fuel in the common rail 8 is in turn fed through fuel-supply lines 9 to injectors 10. Shown in the drawing are four injectors 10 for a 4-cylinder engine, which are arranged, one to each cylinder, so as to charge the fuel into each combustion chamber in the four cylinders, not shown. If the cylinders in the multi-cylinder engine are assigned with the cylinder number n of from #1 to #4 in accordance with the in-line cylinder array, the firing order i for the cylinders is #1→#3→#4→#2.

The fuel released from the high-pressure fuel pump 5 returns to the fuel tank 1 through a fuel recovery line 11b. The unconsumed fuel remaining in each injector 10 out of the fuel fed through the fuel-supply lines 9 into the injectors 10 may return to the fuel tank 1 through the a recovery line 11b. A controller unit 13 is applied with signals from various sensors for monitoring the operating conditions of the engine, the sensors including a crank angle sensor for detecting the rotational frequency of the engine, an accelerometer for detecting the throttling, a coolant temperature sensor for detecting the cooling water temperature, an intake air pressure sensor and other sensors. The controller unit 13, in addition, is applied with a signal from a pressure sensor that is provided in the common rail 8 to detect the fuel pressure in the common rail 8. The controller unit 13 energizes the solenoid-operated valves incorporated in the injectors 10, depending on the signals applied thereto, so as to control the fuel-injection characteristics, that is, the fuel-injection timing and the amount of the injected fuel, of every injector 10, thereby to charge the fuel into its associated combustion chamber with the optimum fuel-injection timing and the optimum amount of the injected fuel. Injection pressure of the fuel discharged out of the injections 10 is usually substantially equal to the fuel pressure stored in the common rail 8. The amount of fuel to be injected per cycle per cylinder is dependent of the duration and pressure of the fuel injection may be regulated by a flow control valve 6 that throttles the flow of the high-pressure fuel to the common fuel supply rail 8. The controller unit 13 controls the flow control valve 6 to thereby regulate the amount of fuel discharged out of the high-pressure pump 5 to the common rail 8, so that the fuel pressure in the common rail 8 may be maintained at the desired fuel pressure, whether the fuel in the common rail 8 is consumed because of fuel injection out of the injectors 10 or the amount of the fuel to be discharged is varied. The common rail system as described just above is well known to those skilled in the art and, therefore, more detailed description will be left out.

Figure 13:
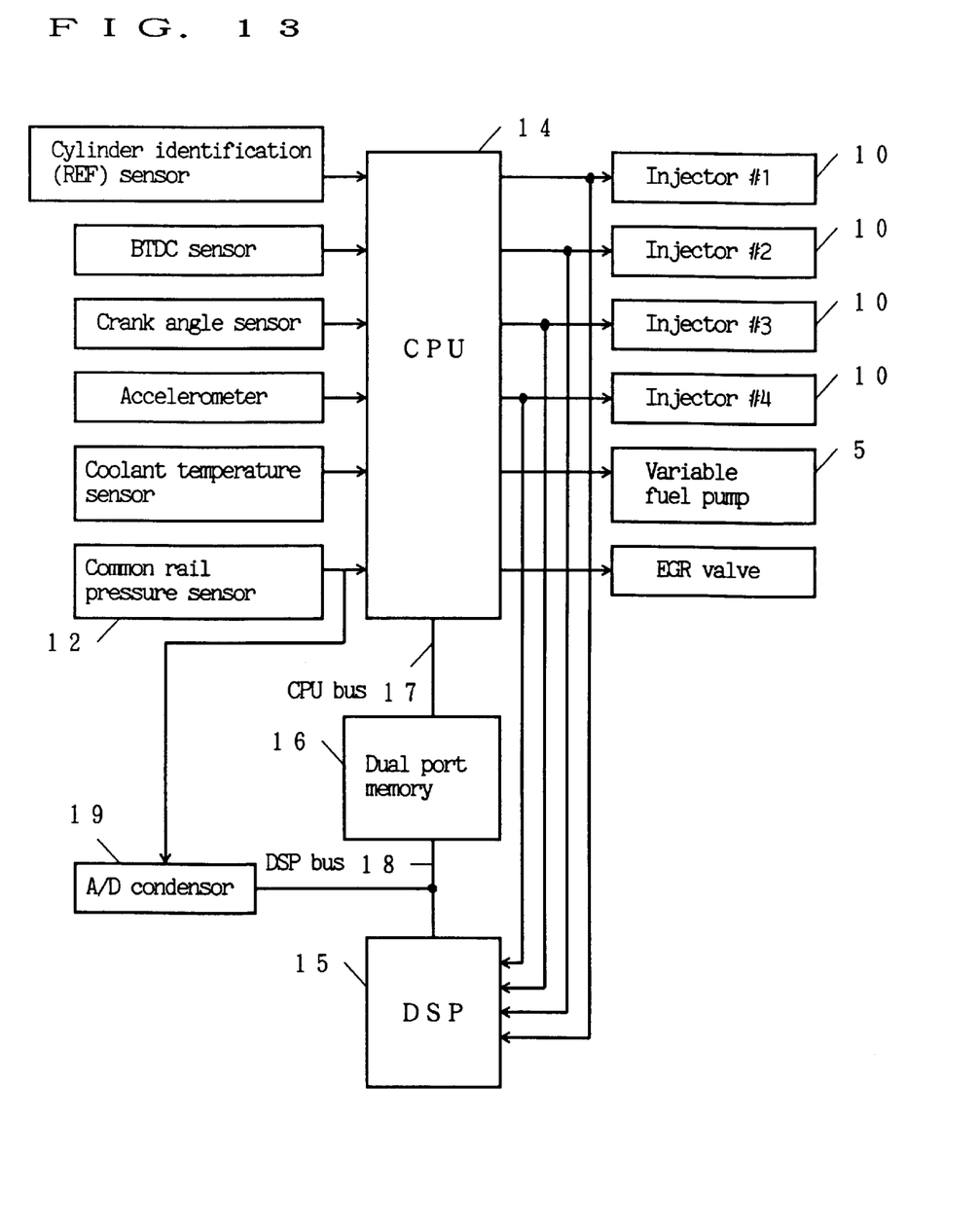
FIG. 13 is a block schematic diagram showing the controller unit in FIG. 12.

Referring to FIG. 13 illustrating the operational relation of the injectors 10 with the sensors through the controller unit 13. FIG. 13 is a block schematic diagram showing the controller unit 13 that is to accomplish the control of fuel injection, inclusive of the control of the amount of fuel injected, at every injection 10 in accordance with the signals applied from the sensors monitoring the operating conditions of the engine. The sensors include a cylinder identification (REF) sensor, a before-top-dead-center (BTDC) sensor and a crank angle sensor. The REF sensor is to identify the preselected angles, for example, 120 deg, before the top dead center in the standard cylinder, for example, #1 cylinder, out of the cylinders #1 to #4. The BTDC sensor is to detect the preselected angles, for example, 60 deg, before the top dead center of the compression phase at each of the cylinders #1 to #4. The crank angle sensor is to read the crank angle at every 1 deg. In 4-stroke-cycle reciprocating engines, four BTDC signals and one REF signal are made to generate during two crankshaft revolutions per cycle. All of the cylinder identification signals issued from the cylinder identification sensor and the crank angle signals from the crank angle sensor are applied to a central processing unit (CPU) 14.

The CPU 14 in the controller unit 13 are further applied with other signals indicating the operating conditions of the engine, such as signals issued from the accelerometer, coolant temperature sensor for monitoring the temperature of water for cooling the engine, common rail pressure sensor 12 for monitoring the pressure in the common rail and the like. The signals issued from the common rail pressure sensor 12 are also input to a digital signal processor (DSP) 15 besides CPU 14. The DSP is of a processor capable of high-speed arithmetic calculation to carry out the processing of the fuel-injection execution and detection, which requires dealing with the vast data with high speed.

Transfer of the data from the CPU 14 to the DSP 15 and vice versa may be carried out through a dual port memory 16 of a common RAM that is capable of read-out/write-in from either of the CPU 14 and the DSP 15. The dual port memory 16 is communicated on its one side with the CPU 14 through a CPU bus 17 while on its other side with the DSP 15 through a DSP bus 18. Analog signals issued from the common rail pressure sensor 12 are input into an A/D converter 19 in which the signals are converted to digital signals that are in turn delivered to the DSP 15 through the DSP bus 18.

The CPU 14 controls the injectors 10, which are provided to the cylinders #1 to #4, each to one cylinder, in connection with the timing of the fuel injection and the amount of fuel to be injected per cylinder per cycle. To this end, the CPU 14 carries out the calculation processing, depending on the information indicative of the operating conditions of the engine, which are input directly from the various sensors, and the outputs of the DSP 12 that makes a processing of the data given from the common rail pressure sensor 12. The DSP 15 may carry out the high-speed arithmetic calculation of the digital signals regarding the common rail pressure. In addition, the CPU 14 controls the flow control valve 6 to regulate the common rail pressure, resulting in controlling the amount of fuel discharged out of the variable fuel pump 5 and also governing an EGR-valves that control the re-circulatory amount of exhaust gas in the exhaust gas re-circulation system.

The following is to explain the preferred embodiment of the present invention, which is applied to the pilot-injection control in the common-rail fuel-injection system illustrated in FIG. 12. The controller unit 13 used in the embodiment is constructed as shown in the block diagram of FIG. 13. The processing steps described hereinafter in detail are the main processing in FIG. 1 carried out in the CPU 14.

Figure 1:
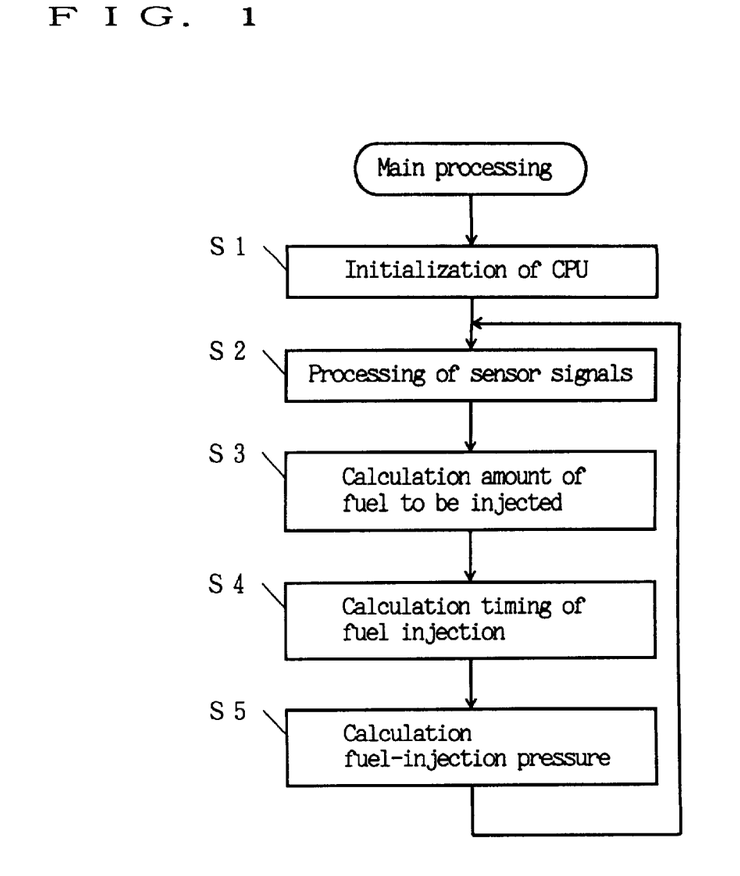
FIG. 1 is a flow sheet illustrating a main processing in a central processor unit, referred to as CPU hereinafter, executed in a fuel-injection system for engines according to the present invention.

Step 1, referred to (S1) hereinafter and so forth,=The CPU 14 is initialized:

Step 2 (S2)=Processing of the signals issued from the sensors. That is, the signals are subject to the A/D conversion and other conversions to the physical quantities:

Step 3 (S3)=The amounts of fuel to be injected are calculated at every injector 10 in accordance with the signals resultant from the processing of (S2) regarding the throttle opening and rotational frequency of the engine. The desired amount of the injected has been previously given in the form of mapped data and stored in the memory with taking parameters of the throttle opening and the rotational frequency:

Step 4 (S4)=The timings of the fuel injection are calculated at every injector 10 in accordance with the signals resultant from the processing of (S2) regarding the throttle opening and rotational frequency of the engine. The desired timing of the fuel injection has been previously given in the form of mapped data and stored in the memory with taking parameters of the throttle opening and the rotational frequency: and Step 5 (S5)=The fuel-injection pressure, or the desired common rail pressure, is calculated, dependent on the engine rotational frequency and the amounts of the injected fuel derived at (S3). The desired pressure of the fuel injection has been previously given in the form of mapped data with taking parameters of the engine rotational frequency and the amount of the injected fuel. More specifically, the flow control valve equipped in association with the fuel pump is regulated so as to render the desired fuel-injection pressure the common rail pressure, or the fuel pressure, monitored at the common rail pressure sensor 12.

Following the initialization of the CPU 14 at (S1), the sequence of steps (S2) to (S5) is carried out at every injector 10 repeatedly whenever the engine operates.

Figure 2:
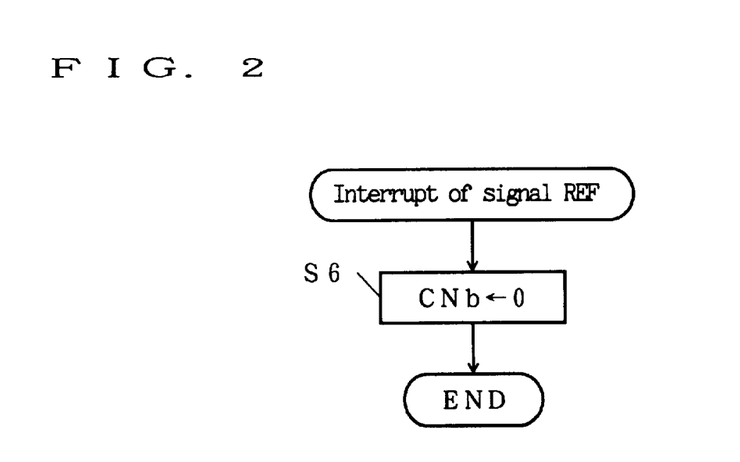
FIG. 2 is a flowchart illustrating an interrupt processing of a standard cylinder identification signal, referred to as REF hereinafter, in the CPU main processing in FIG. 1.

Upon the cylinder identification signal, that is, the REF signal being issued, the interrupt processing of the REF signal is carried out as shown in FIG. 2, which is a flowchart illustrating the interrupt processing of the REF signal in the CPU main processing in FIG. 1. The interrupt processing includes therein a reset processing in which the count value CNb of the BTDC signal is reset to 0. Namely, the count value CNb may take any one integer of from 0 to 3 for the 4-cylinder engine. The fuel injection and firing take place at every injector in succession in accordance with the circulatory firing order for four cylinders from the first event where the count value is 0 to the last event where the count value is 4. At step 6 (S6), the REF signal is output just before the count value taking the 4 whereby the interrupt processing is carried out, resulting in resetting the count value CNb the 0.

Figure 3:
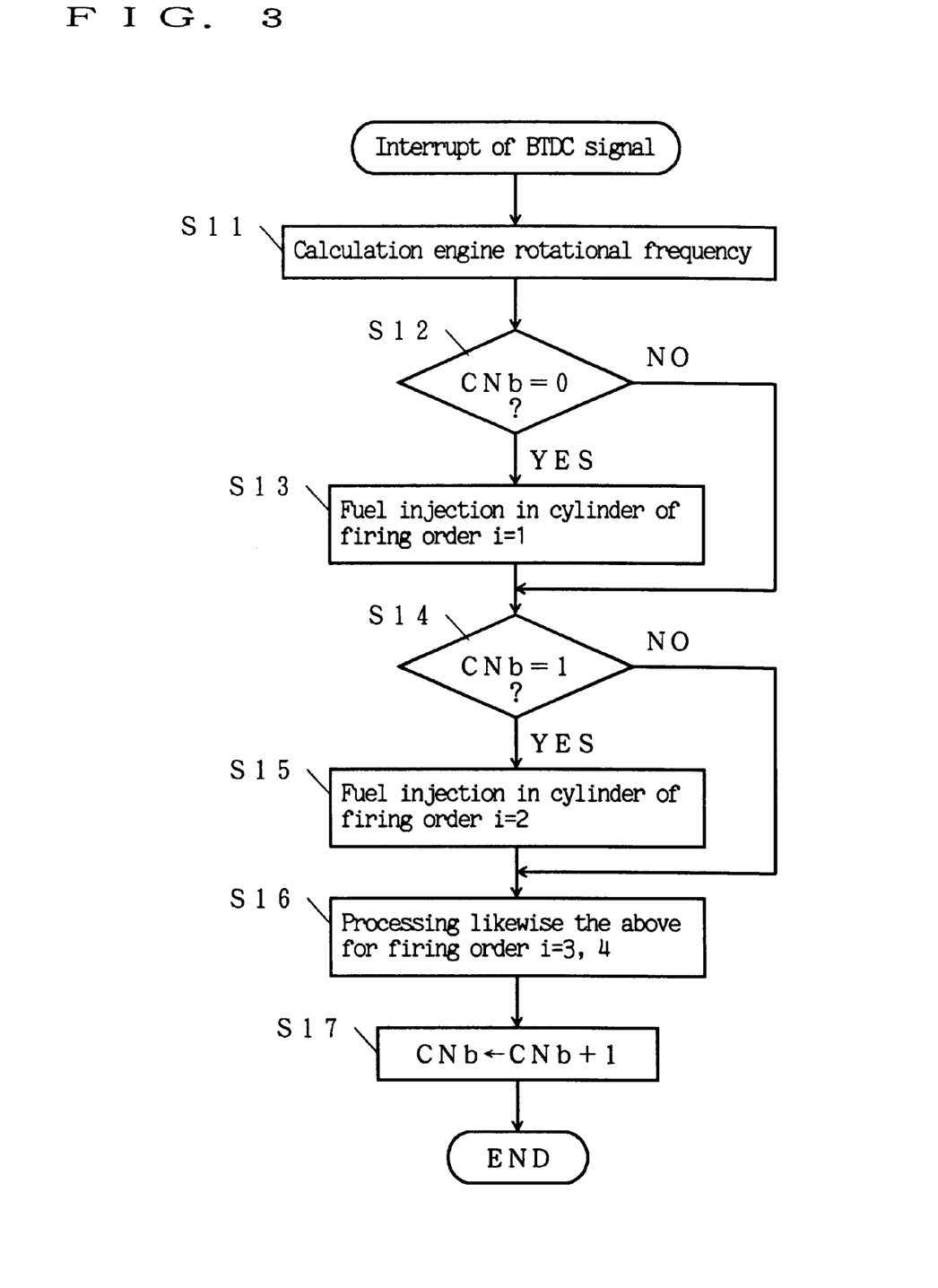
FIG. 3 is a flowchart illustrating an interrupt processing of a before-top-dead-center signal, referred to as BTDC hereinafter, in the CPU main processing in FIG. 1.

FIG. 3 is a flowchart illustrating an interrupt processing of a BTDC signal in the CPU main processing. When the BTDC sensor detects the event such that the crank angle at every cylinder has reached the preselected angles of, for example, 60 deg before the top dead center of the compression phase, the BTDC signal is applied simultaneously to the CPU 14 in which the interrupt processing of the BTDC signal is made to start. The interrupt processing of the BTDC signal is executed along the following steps.

Step 11 (S11)=Calculating the rotational frequency of the engine 1. That is, the rotational frequency of the engine 1 per unit length of time is calculated depending on the length of time required from the issuing of the last BTDC signal to the issuing of the present BTDC signal:

Step 12 (S12)=Discriminating whether the count value is 0 or not:

Step 13 (S13)=If the count value CNb is 0, the fuel-injection processing, or the execution of from the (S2) to (S5) and the subsequent fuel injection, is carried for the injector 10 that is provided in the cylinder of the firing order i=1, or the #1 cylinder:

Step 14 (S14)=If the count value CNb is other than the 0, the decision is made to pursue immediately this step 14 for discriminating whether the count value CNb is 1:

Step 15 (S15)=If the count value CNb is 1, the fuel-injection processing, or the execution of the from (S2) to (S5) and the subsequent fuel injection, is carried for the injector 10 that is provided in the cylinder of the firing order i=2, or the #3 cylinder:

Step 16 (S16)=If the count value CNb is other than the 1, the decision is made to pursue immediately this step 16 where if the discrimination likewise with the above is YES, the fuel injection is carried out at the associated injector: and Step 17 (S17)=With the fuel-injection processing being carried out for any one of the injectors #1 to #4 at the (S13), (S15) or (S16), the discrimination of the count value CNb other than the corresponding count value becomes surely "NO". Hence, adding 1 to the last count value CNb prepares a new count value and then the interrupt processing is terminated. In next interrupt processing, the discriminations for the next count values are YES at any of the steps likewise the (S12), (S14) and (S16). After the count value increasing one by one becomes 3, the interrupt processing (S6) of the REF signal enables to reset the count value CNb the 0 just before the count value taking the 4. In the interrupt processing of the BTDC signal as described above, the cylinder to be charged with the next injected fuel is identified in accordance with the count value CNb and the fuel-injection processing is carried out for the injector arranged to the cylinder.

Figure 4:
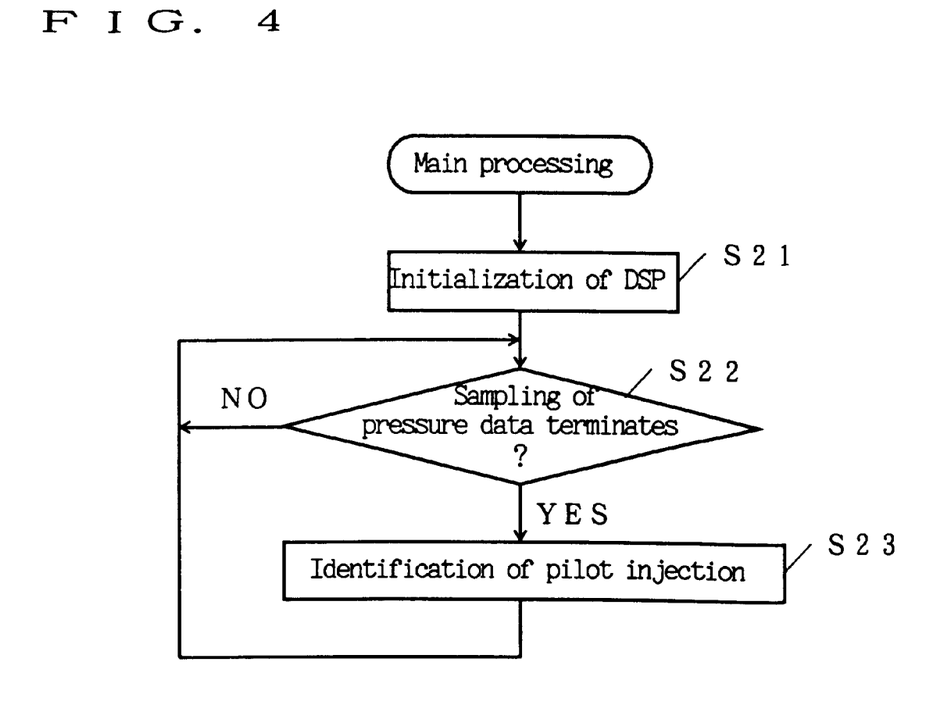
FIG. 4 is a flowchart illustrating a main processing in a digital signal processor, referred to as DSP hereinafter, executed in a fuel-injection system for engines according to the present invention.

FIG. 4 is a flowchart illustrating a main processing in a digital signal processor (DSP). This main processing includes therein the following steps.

Step 21 (S21)=The DSP is first initialized:

Step 22 (S22)=Whether the sampling of pressure data ends is discriminated: and

Step 23 (S23)=When the sampling of the pressure data has ended, whether the pilot injection exists or does not exist is identified through the routine of pilot-injection identification. In contrast, if the sampling of the pressure data has not finished, the sampling is continued. The details of the (S22) and (S23) will be discussed later.

Figure 5:
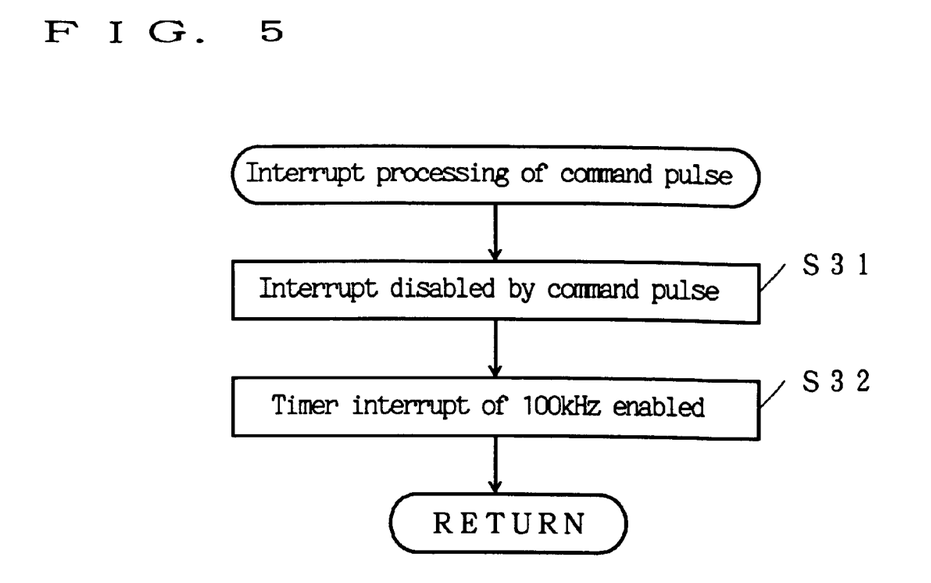
FIG. 5 is a flowchart illustrating an interrupt processing of a command pulse in the DSP main processing in FIG. 4.

FIG. 5 is a flowchart illustrating an interrupt processing of a command pulse in the DSP main processing. The interrupt processing takes place by the detection of pulse edge of the command pulse. The interrupt processing may be enabled by the processing in the CPU of the injector equipped in the nth cylinder.

Step 31 (S31)=Disabling the interrupt of the command pulse edge. That is, the interrupt to the command pulse for the pilot injection disables the interrupt to the command pulse for the main injection: and Step 32 (S32)=Enabling the timer interrupt of 100 kHz.

Figure 6:
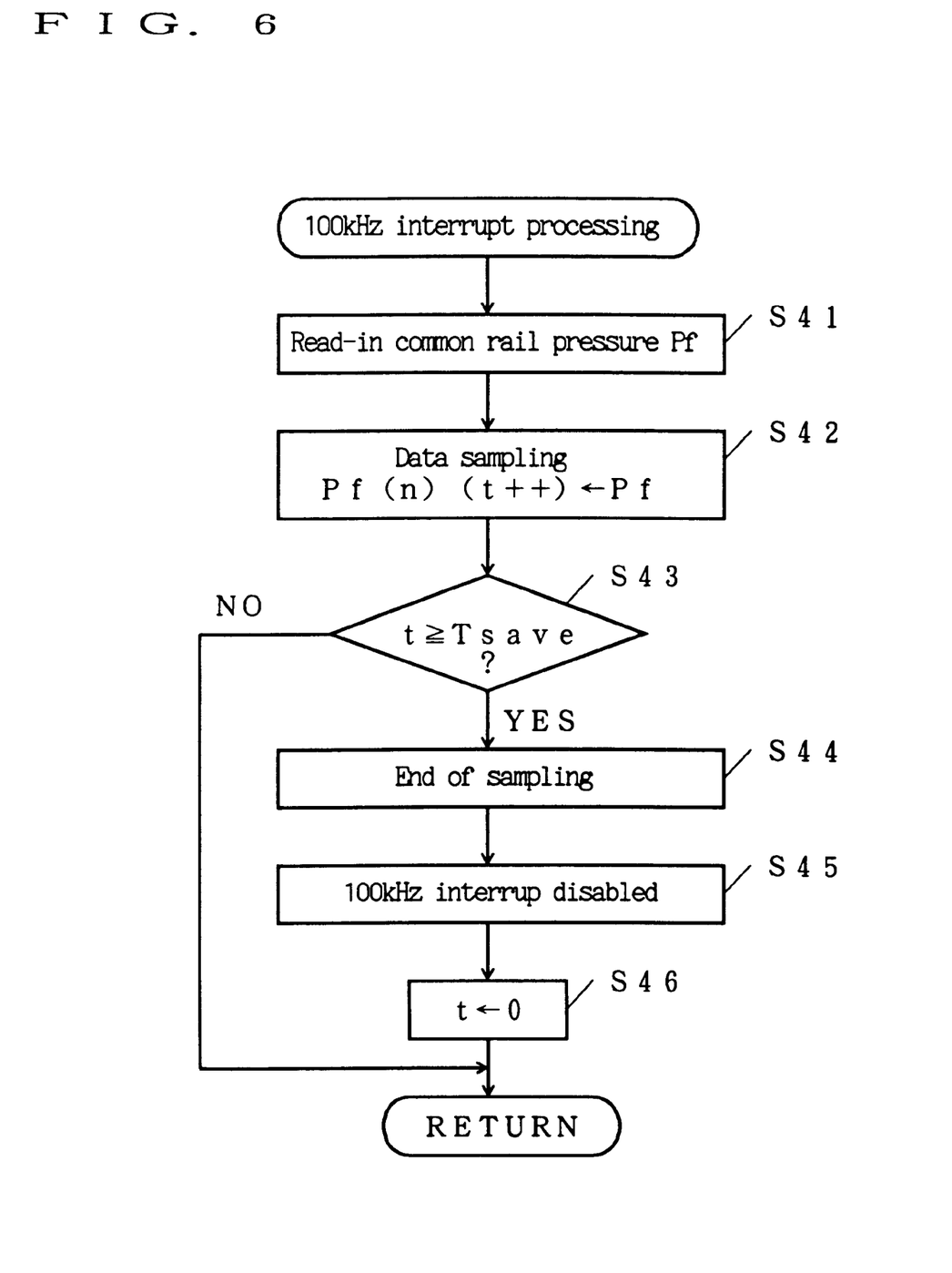
FIG. 6 is a flowchart illustrating a 100 kHz interrupt processing in the DSP main processing in FIG. 4.

FIG. 6 is a flowchart illustrating a 100 kHz interrupt processing in the DSP main processing.

Step 41 (S41)=Read-in of the common rail pressure Pf at the time of the 100 kHz timer interrupt:

Step 42 (S42)=Storing the common rail pressure in a data buffer on the RAM. With a counter t advancing incrementally, the data sampling is sequentially carried out for the common rail pressure and the obtained data is stored in the memories that are provided for the cylinders, each to one cylinder:

Step 43 (S43)=Whether the counter t has reached a pre-determined sampling interval Tsave is identified. If the counter t has not yet reached the pre-determined sampling interval Tsave this routine terminates without disabling the interrupt:

Step 44 (S44)=After the data in the sampling interval has been stored, the 100 kHz-timer interrupt terminates so as to disable the 100 kHz interrupt processing: and Step 45 (S45)=The counter t is reset to 0.

Figure 7:
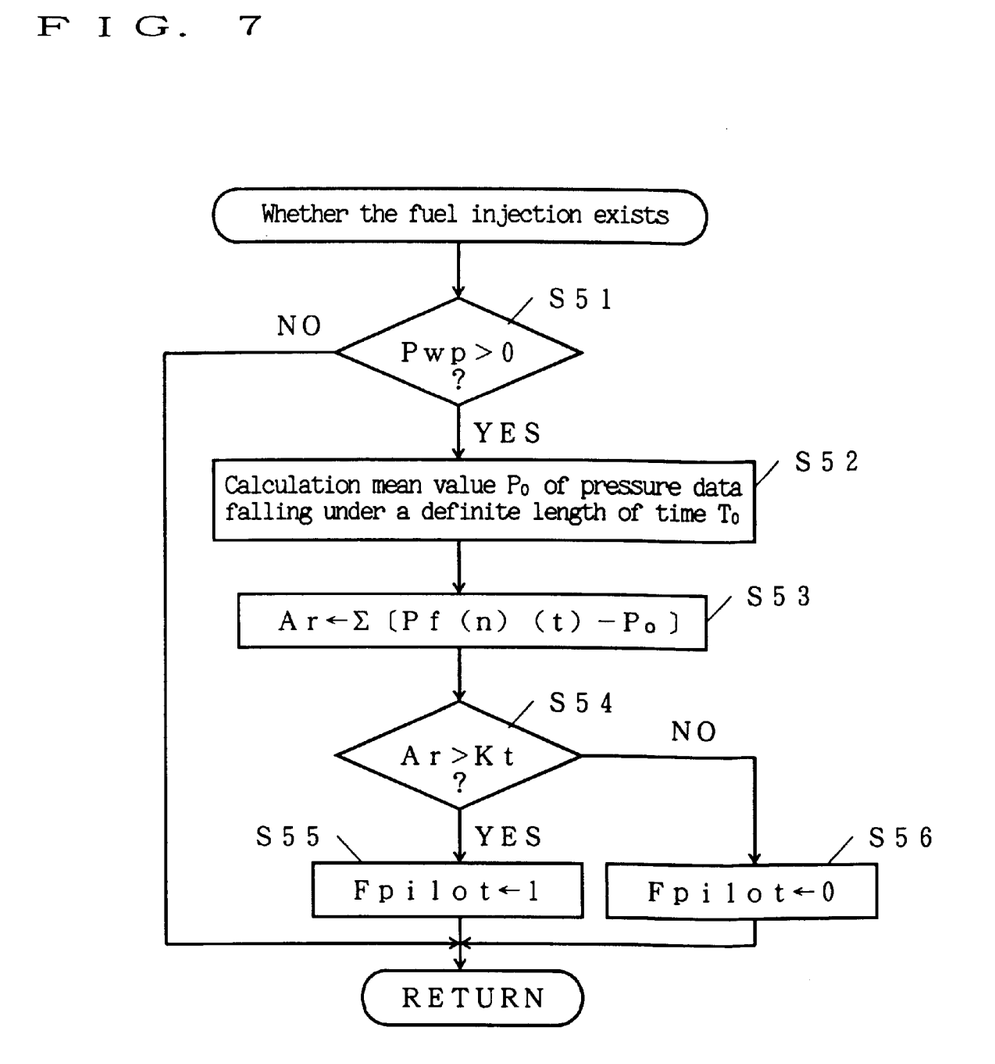
FIG. 7 is a flowchart illustrating a decision-making process of whether the fuel injection exists in the DSP main processing in FIG. 4.

FIG. 7 is a flowchart illustrating a decision-making process of whether the fuel injection exists in the DSP main processing. This processing is made to start after the end of the sampling of data and comprises the following steps.

Step 51 (S51)=Whether an instruction to inject the fuel exists or not is identified, dependent on a pulse width of a command pulse to carry out the pilot injection, that is, whether a pulse width Pwp for the pilot injection is over the 0:

Step 52 (S52)=On triggering the command pulse, the mean value $P_0$ is calculated for the stored data that fall under a definite length of time $T_0$ beginning with the front of the stored data. It has been found that a length of time, spanning from the application of the command pulse to the starting of the actual fuel injection to thereby cause a decrease of the common rail pressure, varies or scatters owing to characteristic difference in the individual injectors, aging or the like. It is further found that the length of time is not less than the definite length of time $T_0$, which may be previously given by experiments. The definite length of time $T_0$, starting with the output of the command pulse, is a period during which no reduction in the common rail pressure happens owing to the fuel injection energized by the command pulse:

Step 53 (S53)=Calculating an area Ar of pressure reduction. The interval Tsave corresponds to the length of time during which the data of the common rail pressure is read in or stored. Hence, the interval Tsave may be necessary to be preselected less than the sum of the length of time $T_0$ and an interval Tint during which both of the pilot and main injections are carried out, or as Tsave<$T_0$+Tint. As an alternative, the interval Tsave may be predetermined as any one of a fixed value and a functional value of the interval Tint:

Step 54 (S54)=Identifying whether the area Ar is over a threshold Kt. In case where the area Ar is identified exceeding the threshold Kt, the decision is made that the pressure drop has happened due to the fuel injection. The pressure drop may be alternatively identified by the comparison of the stored pressure itself with the preselected threshold, instead of the area Ar. Nevertheless, the decision by the area Ar makes possible less the influences owing to the noise and minute variation in pressure, compared with the decision by the pressure itself:

Step 55 (S55)=In case where the area Ar exceeds the threshold Kt, the decision is made that the fuel injection has taken place and a pilot flag Fpilot is reset to 1: and Step 56 (S56)=In case where the area Ar does not exceed the threshold Kt, the decision is made that no fuel injection has taken place and a pilot flag Fpilot is reset to 0.

The identification regarding whether the pilot injection takes place or not is used in the BTDC interrupt processing prior to the next fuel injection of the cylinder.

Figure 8:
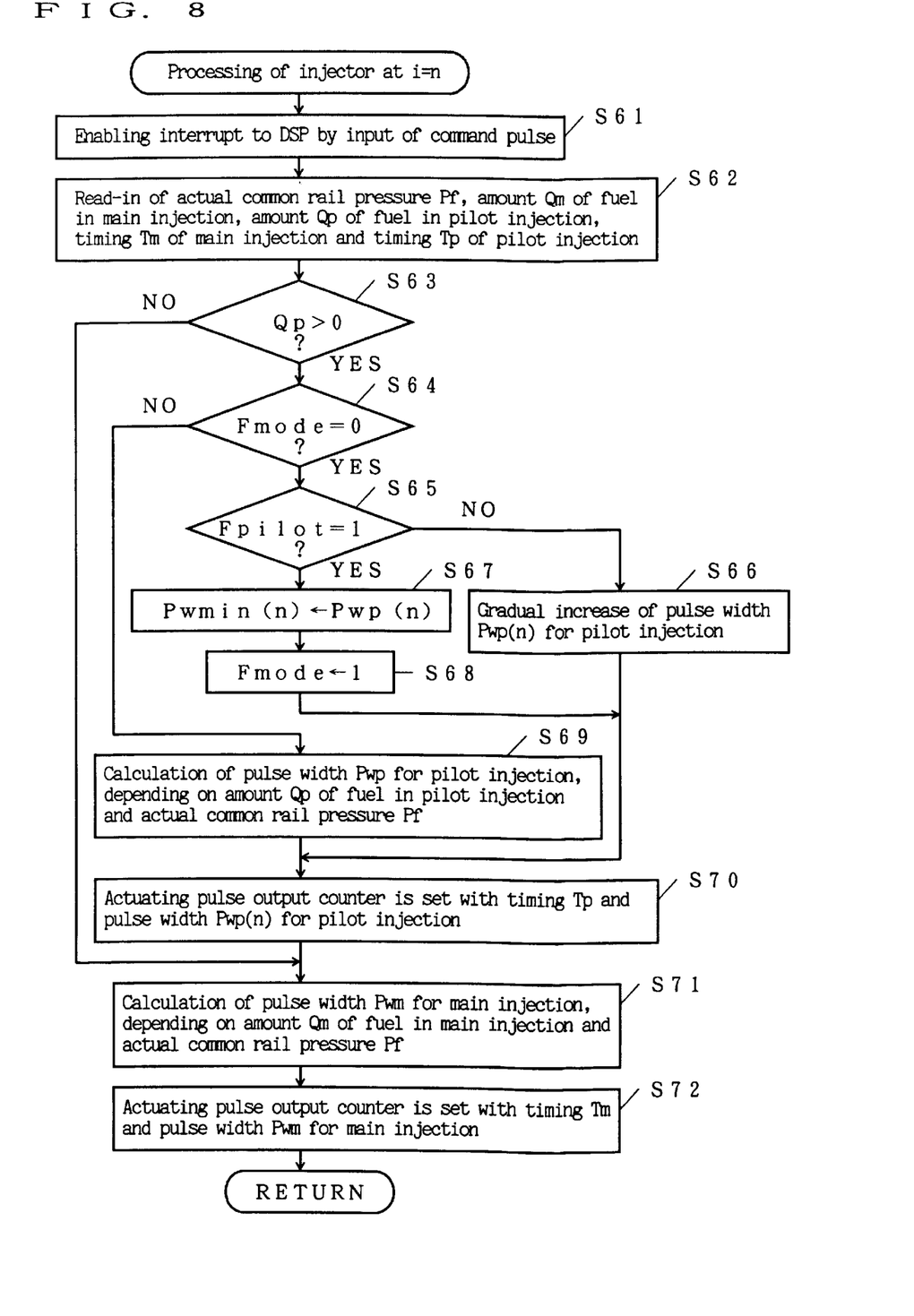
FIG. 8 is a flowchart illustrating a processing of the fuel injection at the nth injector in the CPU main processing in FIG. 1.

FIG. 8 is a flowchart illustrating a processing of the fuel injection, inclusive of the pilot injection, at the nth injector in the CPU main processing. This processing is an interrupt processing by the BTDC signal occurring before the fuel injection at the nth cylinder and comprises the following steps. In this processing, the CPU learns the command pulse width at the beginning of the fuel injection in the injector. In contrast, the residual range of the command pulse width is given in a Pw-Q map, mapping of the command pulse width versus the fuel injection, which was obtained experimentally.

Figure 9:
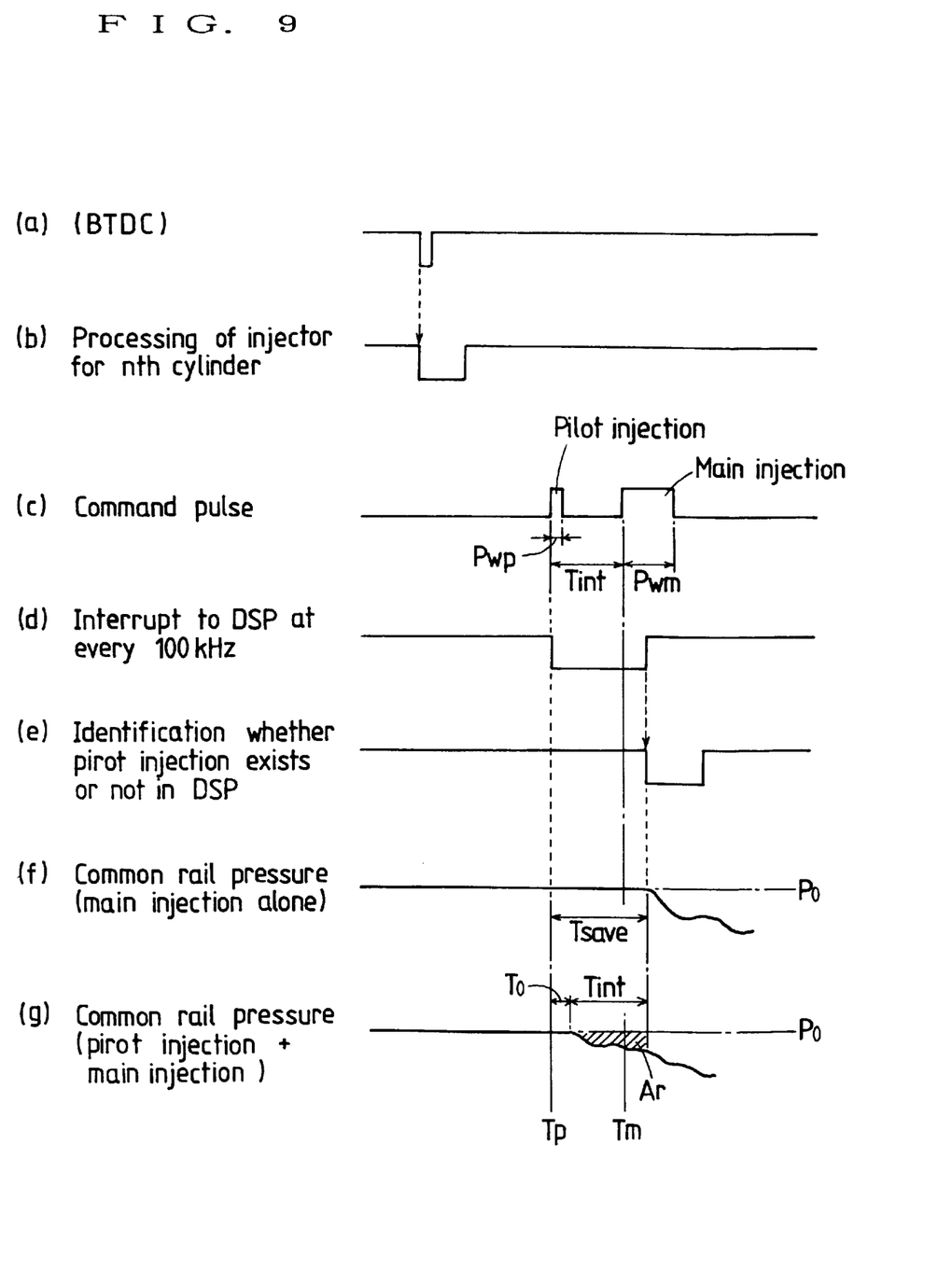
FIG. 9 is a timing diagram of coordinate relations between the changes in the I/O signals and the software operation.

Step 61 (S61)=Enabling the interrupt to the DSP by the command pulse:

Step 62 (S62)=Read-in of the desired amount Qm of fuel in the main injection, the desired amount Qp of fuel in the pilot injection, the timing Tm of the main injection and the timing Tp of the pilot injection, which are calculated in the CPU main processing shown in FIG. 1, and also the actual common rail pressure Pf monitored by the pressure sensor 12:

Step 63 (S63)=Identifying whether the desired amount Qp of fuel in the pilot injection is over the 0. That is, where the desired amount Qp of fuel in the pilot injection is identified having a positive value, the decision is made so as to accomplish the pilot injection:

Step 64 (S64)=On accomplishing the pilot injection, identifying whether the minimum pulse width of the present invention is to be learned or not. In this phase, whether a mode graph Fmode is 0 or not is identified dependent on the mode graph Fmode that is set in the 0 when the engine halts or the ignition key is in "off" position:

Step 65 (S65)=In case of mode graph Fmode=0 at the (S64), the learning of the CPU is executed according to the following. That is, identifying whether the pilot flag Fpilot, processed in the DSP processing in the identification whether the pilot injection exists or not, is set to 1. In other words, identifying whether the pilot injection has been energized in the preceding cycle:

Step 66 (S66)=When the identification in the (S65) is made that no pilot injection has been energized in the preceding cycle, a minimal unit quantity is added to the pilot pulse width having the initial value of a pulse width, for example, 0, where the actual amount of the injected fuel becomes 0, to thereby update the pulse width Pwp for the pilot injection for advance to the step 70. As the mode graph Fmode is set to 0 at the beginning of this routine when the engine is halt and also the identification is made that no pilot injection has been energized in the preceding cycle, the processing enters the (S66) in which the pulse width Pwp for the pilot injection is updated with an increment:

Step 67 (S67)=When the identification in the (S65) is made that the pilot injection has been energized in the preceding cycle, the minimum command pulse width Pwmin (n) of the actuating current applied to the solenoid-operated valve of the nth injector is give as the command pulse width Pwp for the pilot injection at the time of the identification:

Step 68 (S68)=Setting the mode flag Fmode to the 1 subsequently to the (S67):

Step 69 (S69)=After the repetitive executions of this routine, the event will happen such that the mode flag Fmode is set to the 1 as the result of the energization of the pilot injection. In the subsequent execution of this routine, the pulse width Pwp for the pilot injection is determined with reference to the mapped data of the desired amount Qp of fuel in the pilot injection and the actual common rail pressure Pf stored at the (S62), because the mode flag Fmode has been identified not in the 0 state at the (S64). That is, the pulse width is obtained by the process of linear interpolation between the minimum value in the mapped data and the minimum pulse width stored at the (S67):

Step 70 (S70)=An actuating-pulse output counter is set with the timing Tp of the pilot injection and the pulse width Pwp for the pilot injection:

Step 71 (S71)=When the (S63) has made the identification in which the amount Qp of the injected fuel in the pilot injection is not the positive value, or the amount of the fuel injected in the pilot injection is 0 and, therefore, the pilot injection is not to be energized, and also when the (S70) has set the output counter with the command pulse for the pilot injection, the pulse width Pwm for the main injection is determined with reference to the mapped data of the desired amount Qm of fuel in the main injection and the actual common rail pressure Pf stored at (S62):

Step 72 (S72)=The output counter is set with the pulse width Pwm determined for the pilot injection at the (S71) and the timing Tm of the main injection at (S62), and then the routine is ended;

Referring to a timing diagram in FIG. 9, the coordinate relations between the changes in I/O signals and the software operation will be explained hereinafter correspondingly to the routine described just above. In accordance with the advance of the crank angle, the BTDC signal issued as shown in (a) from the sensor makes to start the fuel-injection phase, shown in (b), of the injector 10 at the nth cylinder. Subsequently, detecting the edge of the command pulse, shown in (c), for the fuel injection generates the 100 kHz interrupt processing shown in (d), to the DSP. The interrupt of the command pulse for the pilot injection inhibits the interrupt of the command pulse for the main injection. Enabling the 100 kHz interrupt processing to the DSP results in the beginning of sampling of the data regarding the common rail pressure, shown in (e), whereby the data of the common rail pressure are gathered during the sampling interval Tsave, shown in (g). Following the finish of the pressure data sampling, whether the pilot injection has existed or not is identified by the processing of the pressure data, shown in (e).

In contrast, in case (f) where no pilot injection is intended, no processing of (d), (e) and (g) may be necessary.

In the processing as described just above, supposing the event such that the (S63) is initially "YES" so as to energize the pilot injection and, nevertheless, the (S64) is "YES" showing the mode of the engine being halted, when the identification in the (S65) is made that no pilot injection has been energized, the (S66) is executed repeatedly so that the pulse width Pwp for the pilot injection, having the initial value of 0, increases gradually and finally results in causing the actual pilot injection. This event is detected by the DSP processing so as to turn the pilot flag Fpilot to the situation showing the existence of the pilot injection, or reset the flag to 1. This makes it possible to cause the routine to advance from the (S65) to the (S67). At the (S67), the pulse width Pwp for the pilot injection updated by the time of the identification is stored in the memory as the minimum command pulse width Pwmin(n). Following setting the mode to 1, the routine proceeds to the (S70). The processing of the (S68) makes it possible that the next execution of this routine may proceeds from the (S64) to the (S69).

At the (S69) the pulse width Pwp for the pilot injection corresponding to the desired amount Qp of fuel in the pilot injection, as shown in FIG. 10, is determined, dependent on the mapped data of the desired amount Qp of fuel in the pilot injection and the actual common rail pressure Pf stored at the (S62), by the process of linear interpolation between the minimum value (Qp1, Pw1) in the mapped data and the minimum pulse width Pwmin stored at the (S67). As apparent from the foregoing, the processing in the DSP and CPU as described just above makes it possible to determine the conductive pulse width at every injector for accomplish a minute amount of the injected fuel such as the pilot injection.

Having described the present invention as related to the embodiment applied to the common-rail fuel-injection control system, it is believed obvious that the present invention is also applicable to the fuel-injection control system using the high-pressure engine oil, instead of the high-pressure fuel, as the hydraulically actuated fluid, and other ordinary injection control system. In the adaptation of the present invention to the fuel-injection control system of the high-pressure engine oil type, the pressure in a high-pressure manifold storing therein engine oil boosted in pressure by an oil pump is substituted for the common rail pressure.

Figure 14:
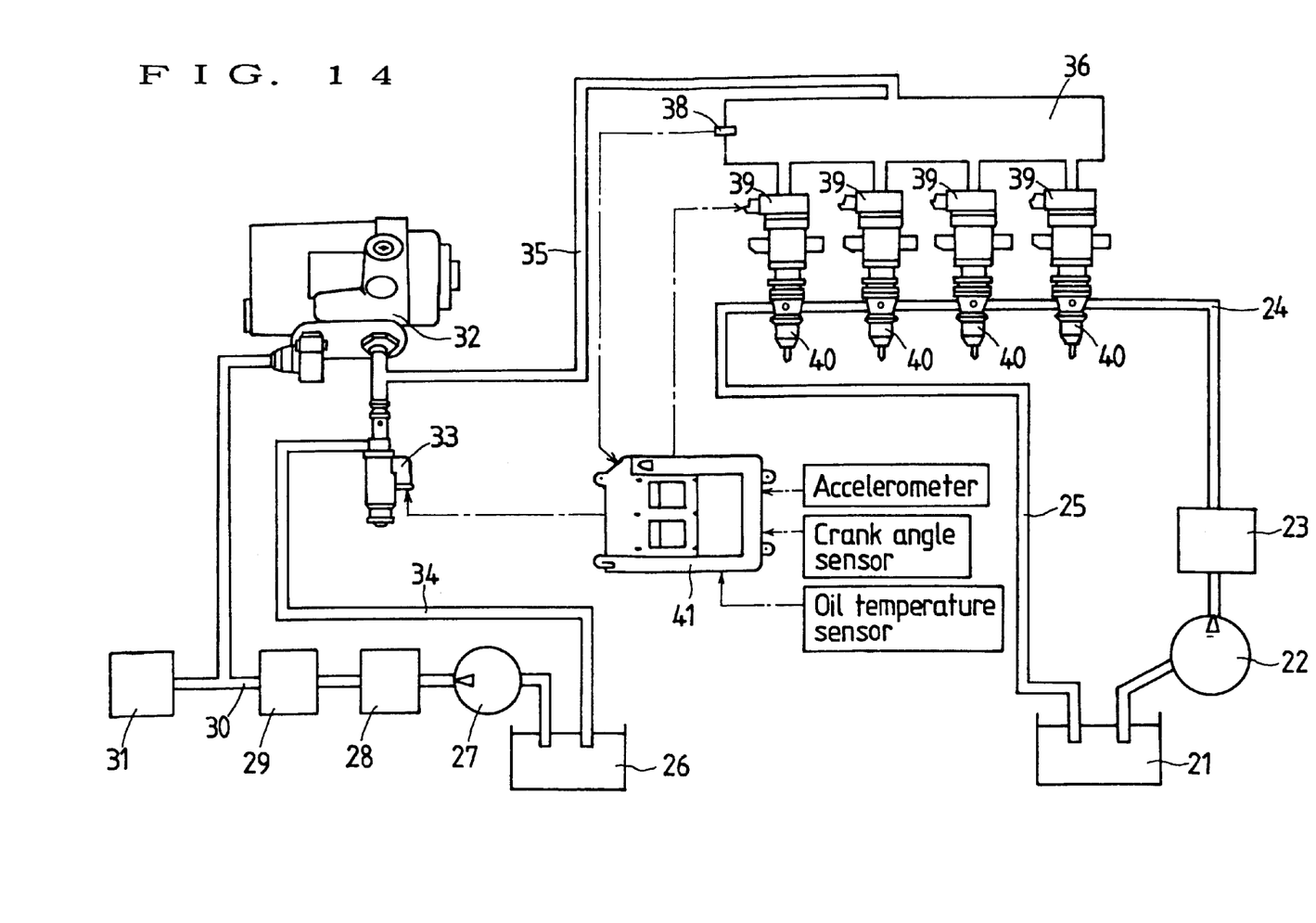
FIG. 14 is a schematic illustration showing a fuel-injection system of hydraulically actuated fluid type in which the high-pressure manifolds are used.

Shown in FIG. 14 is an example of the fuel-injection control system of the hydraulically actuated type using therein the engine oil as the hydraulically actuated fluid. On the fuel-injection control system of the hydraulically actuated type in FIG. 14, fuel in a fuel tank 21 is fed to a common fuel supply rail 24 through a fuel filter 23 by the action of a fuel pump 22. The common rail 24 is communicated with fuel inlet and outlet ports of injectors 40. That is, the injectors 40 are arranged along the common rail 24 such that their inlet and outlet ports are applied with the fuel of a preselected pressure. The unconsumed fuel remaining in each injector 40 may return to the fuel tank 21 through a fuel recovery line 25.

The injectors 40 are each applied with the hydraulically actuated fluid, or the actuating oil, which is supplied from a high-pressure oil manifold 36 through a solenoid-operated valve 39. The high-pressure oil manifold 36 is supplied with the oil by an oil pump 27 from the oil reservoir 26 through an oil supply line 30 in which are arranged an oil cooler 28 and an oil filter 29. Moreover the oil supply line 30 is branched into a lubricating line communicating with an oil gallery 31 and a hydraulically actuated oil line 35 including a high-pressure oil pump 32 therein. A flow control valve 33 regulates the amount of leakage of the hydraulically actuated oil to thereby control the oil supply to the high-pressure oil manifold 36 from the hydraulic pump 32. A controller unit 41 is to control both of the flow control valve 33 and solenoid-operated valves 39 of the injectors 40. To this end, the controller unit 50 is applied with data indicative of the operating conditions of the engine, that is, throttle valve openings detected by a accelerometer, crankshaft angles detected by a crank angle sensor, and hydraulic pressures of the hydraulically actuated oil in the high-pressure oil manifold 36, which is detected by a pressure sensor 38 in the high-pressure oil manifold 36. The crank angles detected by the crank angle sensor are available to control the beginning and duration of the electric conduction of the actuating current per cycle, in cooperation with signals from sensors indicative that a piston has reached the top dead center or the pre-determined position just before the top dead center of the compression phase at any standard cylinder or each cylinder. The flow control valve is throttled by the control signals from the controller unit 41 so that the excess amount of the high-pressure oil from the high-pressure oil pump 32 may be recovered as the amount of leakage to the oil reservoir 26. The controller unit 41 is further applied with other signals issued from an oil and/or water temperature sensor and an intake air pressure sensor.

The signals issued from the controller unit 41 instructing the beginning and duration of the actuating current per cycle control the energization of the solenoid-operated valve 39 to thereby regulate the timing and duration of the high-pressure oil supply into pressure chambers in the injectors 40, resulting in controlling the timing and duration of the fuel injection at the injectors 40. The low-pressure fuel fed into the injectors 40 from the common rail 24 flows into intensifying chambers while the high-pressure oil from the high-pressure oil manifold 36, or oil rail, flows into pressure chambers in the injectors 40 by actuation of the solenoid-operated valve 39. The high-pressure oil in the pressure chambers pressurizes the fuel in the intensifying chambers through boosting pistons. The intensified fuel lifts the needle valves to spray out of injection holes at the distal of each injection nozzle into the combustion chambers.

The detailed structure of the injectors 40 as described just above and the fuel-injection system having therein such injectors may be simply provided by, for example, the art disclosed in Published Japanese translations of PCT international publication No. 511527/1994.

Although the means for detecting the timing when the injector begins injecting the fuel has been described in its preferred form with the pressure sensor arranged in the common rail or high-pressure manifold, it is understood that the detecting means, as an alternative to the pressure sensor, may be of a lift sensor that may detect an amount of lift by which the needle valve of the injector is raised from its seated position. In this alternative design, a point of time when the lift sensor has detected the least preselected amount of lift is recognized as the timing for making the injector to begin the fuel injection.

What is claimed is:

1. A fuel-injection system for an engine, comprising injectors for injecting fuel into combustion chambers of the engine dependently on a hydraulic pressure of a hydraulically actuated fluid supplied from an accumulator, electronic devices each energized by an electronic actuating current to thereby control the hydraulic pressure of the hydraulically actuated fluid, and a controller unit for determining a desired amount of a injected fuel per cycle in accordance with signals issued from detecting means monitoring operating conditions of the engine and further determining a conductive duration of the actuating current to the electronic devices correspondingly with the desired amount of fuel to be injected per cycle, whereby the controller unit changes incrementally the conductive duration from the minimal conductive duration at which no fuel injection is admitted at the injector, identifies the minimum conductive duration with the conductive duration where the injectors begin to inject the fuel, and determines the conductive duration corresponding to a minute desired amount of fuel to be injected, depending on the minimum conductive duration.

2. A fuel-injection system for an engine according to claim 1, wherein the detecting means include a pressure sensor for monitoring a pressure of the hydraulically actuated fluid in the accumulator, and the controller unit identifies a timing for the beginning of the fuel injection at the injectors with the timing at which the pressure value of the hydraulically actuated fluid detected by the pressure sensor falls below a preselected value.

3. A fuel-injection system for an engine according to claim 1, wherein the detecting means include a lift sensor for monitoring an amount of lift of needle valves in the injectors, and the controller unit identifies a timing for the beginning of the fuel injection at the injectors with the timing at which the lift sensor detects a preselected amount of lift.

4. A fuel-injection system for an engine according to claim 1, wherein the controller unit divides the desired amount of the injected fuel into a pilot injection part and a main injection part, and determines the conductive duration corresponding to the pilot injection part, depending on the minimum conductive duration.

5. A fuel-injection system for an engine according to claim 1, wherein the electronic devices are each composed of a solenoid-operated valve arranged in the associated injector so as to control the supply of the hydraulically actuated fluid into the injector.

6. A fuel-injection system for an engine according to claim 1, wherein the conductive duration corresponding to the desired amount of the injected fuel is given by interpolating between the minimum conductive duration and any specified conductive duration corresponding to any specified desired amount of the injected fuel.

* * * * *